United States Patent
Lang et al.

(10) Patent No.: US 9,192,104 B1
(45) Date of Patent: Nov. 24, 2015

(54) LIFT LINK OVERLOAD PROTECTION ASSEMBLY

(71) Applicant: Deere & Company, Moline, IL (US)

(72) Inventors: Eric R. Lang, Newhall, IA (US); Henry D. Anstey, Ottumwa, IA (US); Alan Lugert, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 24 days.

(21) Appl. No.: 14/271,878

(22) Filed: May 7, 2014

(51) Int. Cl.
*A01F 15/08* (2006.01)
*F16P 5/00* (2006.01)
*B30B 15/28* (2006.01)

(52) U.S. Cl.
CPC ........... *A01F 15/0858* (2013.01); *B30B 15/281* (2013.01); *F16P 5/005* (2013.01)

(58) Field of Classification Search
CPC ..... A01F 15/0858; A01F 15/042; B30B 1/14; B30B 15/282; B30B 15/281; F16P 5/005; F16P 7/02
USPC .......................... 100/4, 8, 19 R, 24, 341, 346
See application file for complete search history.

(56) References Cited

U.S. PATENT DOCUMENTS

| | | | | |
|---|---|---|---|---|
| 2,760,429 A | * | 8/1956 | Skromme | 100/19 R |
| 3,027,825 A | * | 4/1962 | Nolt et al. | 100/19 R |
| 3,320,875 A | * | 5/1967 | Vidrine | 100/24 |
| 3,489,077 A | * | 1/1970 | Eby et al. | 100/19 R |
| 4,117,775 A | | 10/1978 | White et al. | |
| 6,698,343 B2 | | 3/2004 | Chassiboud | |
| 7,073,434 B2 | * | 7/2006 | Roth | 100/230 |
| 7,458,620 B2 | | 12/2008 | Rotole et al. | |
| 8,069,780 B2 | | 12/2011 | Demulder et al. | |
| 8,276,508 B2 | * | 10/2012 | Huber et al. | 100/50 |

OTHER PUBLICATIONS

Krone lift link for 100 John Deere baler (3 pages).

* cited by examiner

*Primary Examiner* — Jimmy T Nguyen

(57) ABSTRACT

A lift link assembly couples a baler needle to a lift arm. The lift link assembly includes a hollow lift link extending along a coupling axis, a lift bar slidably received by the lift link and an adjusting link. An overload protection mechanism includes a block fixed to the lift bar and coupled to the adjusting link, and a plate fixed to an end of the lift link. A pair of clamping bolts clamp the plate to the block. The clamping bolts are in tension and are substantially parallel to the coupling axis.

23 Claims, 3 Drawing Sheets

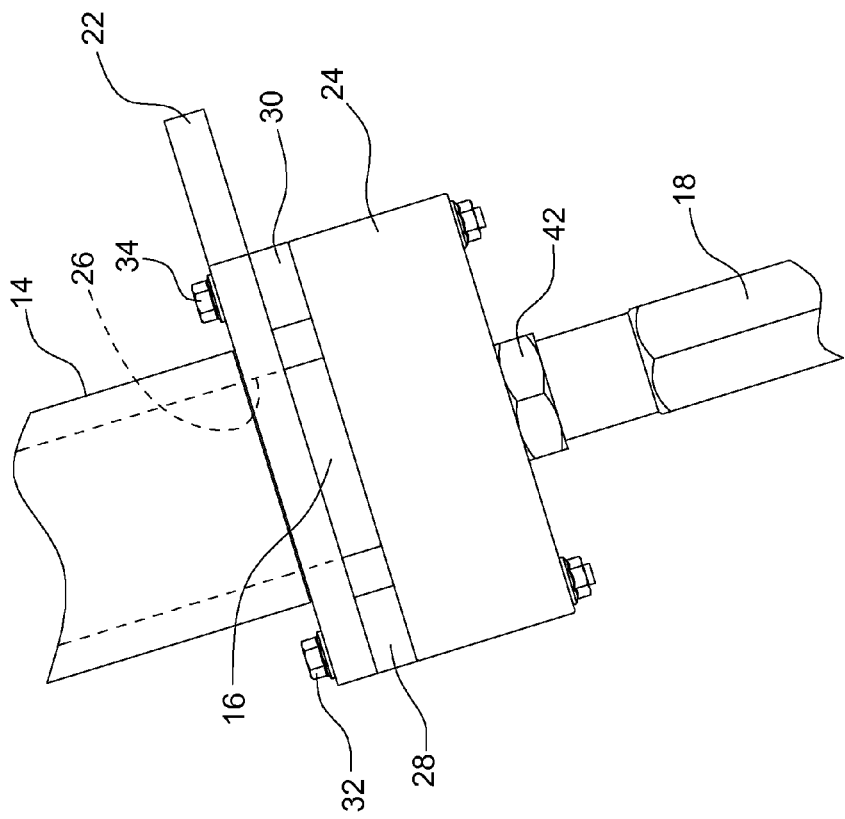
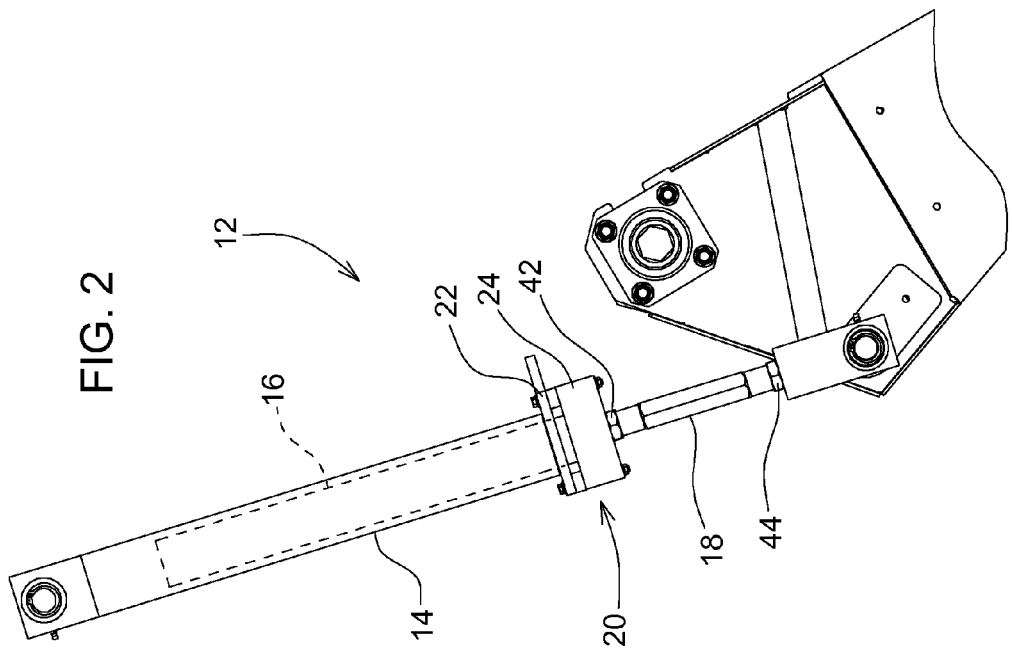

LIFT LINK OVERLOAD PROTECTION ASSEMBLY

FIELD

The present disclosure relates to a lift link overload protection mechanism, such as for a lift link which connects a baler needle to a lift arm.

BACKGROUND

A conventional baler produces a bale of crop material. Moving needles wrap a tying medium, such as strands of twine or wire, around the completed bale. The needles are retracted from the bale case when a tying operation is completed after the last working stroke of the plunger which completed the bale. Each needle pivots about a fixed shaft, and is coupled to a pivoting lift arm by a lift link. Each lift link includes an adjustment linkage so that each needle can be properly positioned in the baler mechanism.

To prevent damage to the lift arms, needles and to other baler components, various types of protection mechanisms are used. Most balers have a needle protection setup which includes a bolt in shear on the lift arm that severs and a separate mechanism tied to the gearbox pushes the needles out of the chamber. Krone makes a lift link with a shearable bolt which extends transverse to the main longitudinal axis of the lift link. As a result, the force on the shear bolt is perpendicular to the axis of the bolt and the bolt has play in it. This results in higher forces to shear the bolt and fatigue loading weakens the bolt over time and causes undesired shears. The loading required to break such a shear bolt is unpredictable and can be much different based on how long the bolt has been used. Such a design may cause an undesired break of the mechanism even when there is no other failure in the baler system.

SUMMARY

According to an aspect of the present disclosure, a baler needle is coupled to a pivoting lift arm by a lift link assembly. The lift link assembly includes a hollow lift link or tube and a lift bar slidably received by the lift link. A plate is fixed to an end of the lift link. A block is fixed to an end of the lift bar. An adjusting link has a first end threadably coupled to a frame of the baler needle and has a second end threadably coupled to the block. The lift link assembly also includes a pair of clamping bolts which clamp the plate and the block together. The clamping bolts are in tension and are aligned parallel to the longitudinal axis of the lift link. The block, plate and clamping bolts form an overload protection mechanism. A pair of optional spacer members may be held between the plate and the block and spaced apart from each other. Or, the spacer members may be eliminated or formed integrally with the block.

The result is an overload protection mechanism and a telescoping link between the frame that lifts the needles and the crank shaft or lift arm that lifts the needle. The telescoping link contains a tube with a flat plate welded to it for bolts to pass through and a flat bar with a block welded to it to be inserted into the tube and bolted to the flat plate. When the needle frame contacts something, the bolts stretch until they yield and break, and the needle frame is then no longer being pulled by the lift arm. The lift arm continues its rotation and the tube with the plate again comes into contact with the bar and block and positively drives the needle frame back to the home position. With this design, the bolted joint is always in tension and is not affected by fatigue like the bolts that are used in shear.

The tension style bolts are always in tension and thus reverse loading is eliminated. The bolts do not fatigue over time so the maximum load value remains constant over time. With a constant known maximum load value, the structure does not have to be designed for a much higher strength to protect against undesired loads. This enables other components to be designed to handle lower loads and reduces costs.

BRIEF DESCRIPTION OF THE DRAWINGS

FIG. 2 is side view of a portion of FIG. 1;
FIG. 3 is a detailed view of a portion of FIG. 2.

DETAILED DESCRIPTION OF THE DRAWINGS

Figure 1:
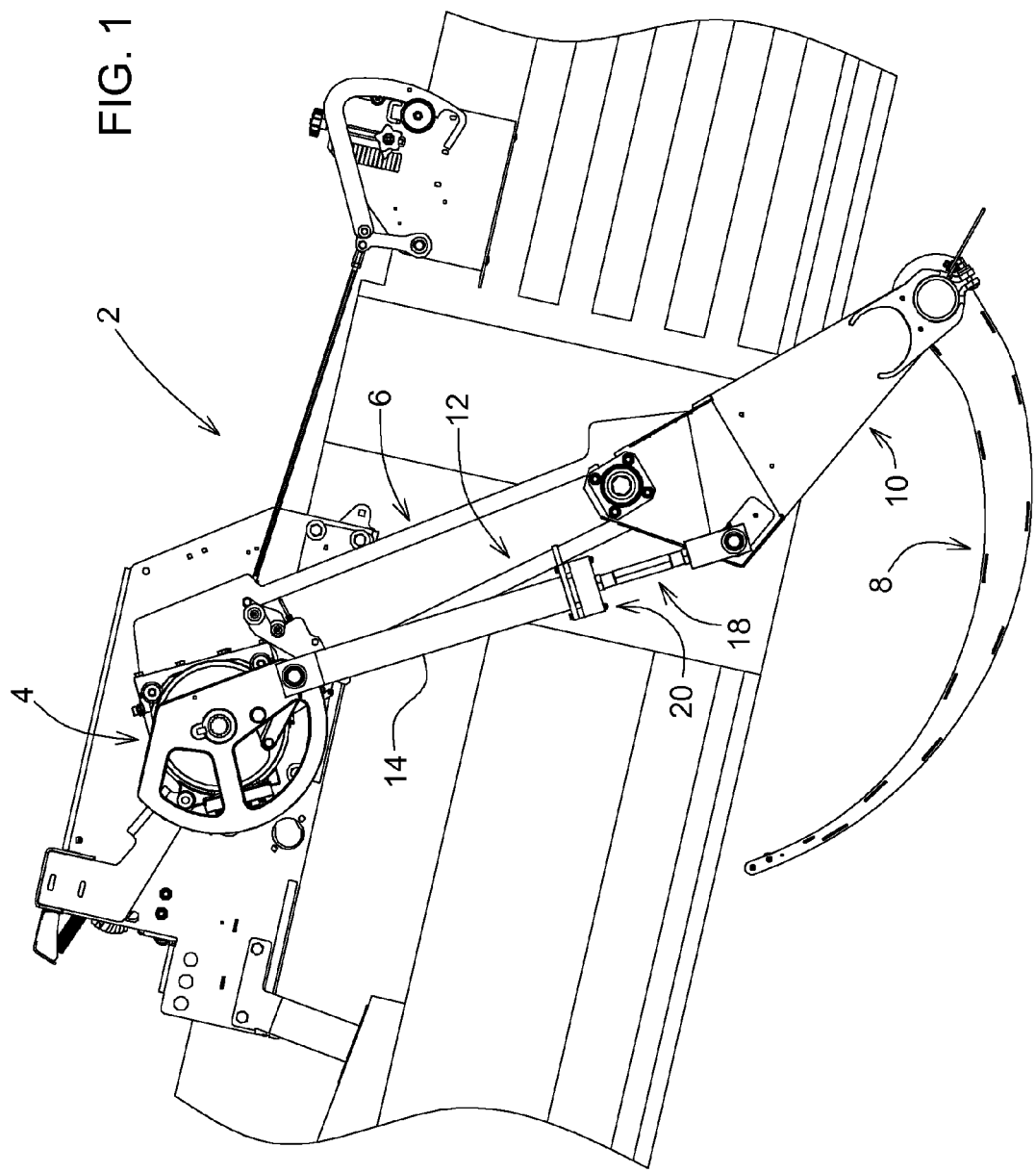
FIG. 1 is a side view of a baler needle drive assembly.
Figure 4:
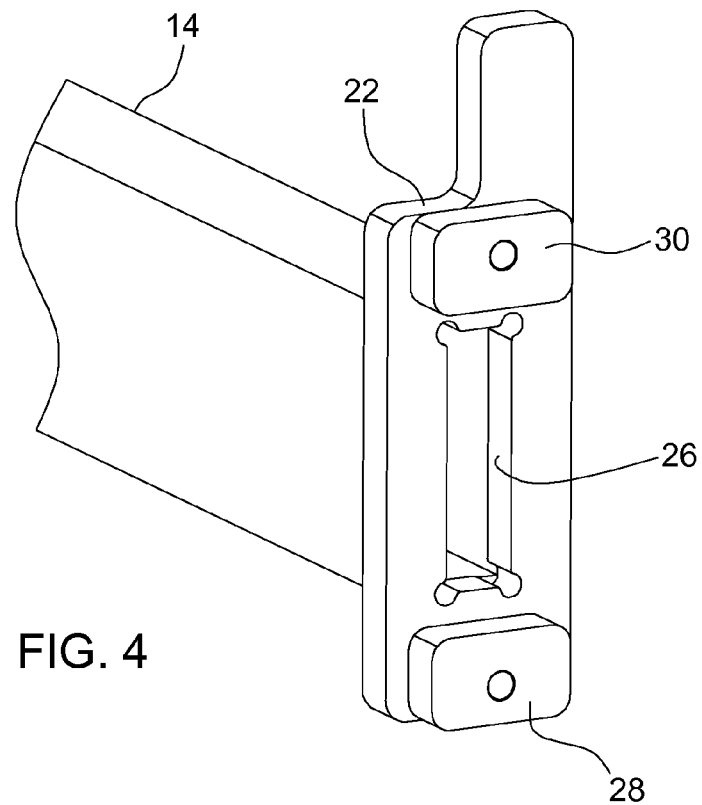
FIG. 4 is a perspective view of the overload protection mechanism of FIG. 3 with parts removed for clarity.
Figure 5:
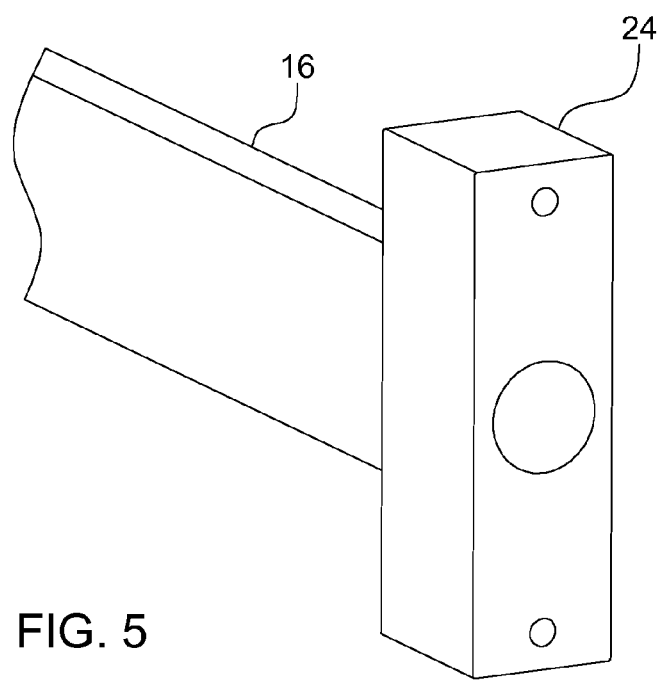
FIG. 5 is a perspective view of the lift bar and block of the shear mechanism of FIG. 3.

Referring to FIG. 1, a baler needle drive assembly 2 includes a pivoting lift arm 4 and a support member 6 which pivotally supports a needle frame 10. The needle frame 10 holds a conventional baler needle 8. The needle frame 10 is coupled to the lift arm 4 by a lift link assembly 12. Referring now to FIGS. 1 and 2, the lift link assembly 12 includes a hollow lift link or tube 14, a solid lift bar or lost motion element 16 slideably received by the lift link 14, an adjusting link 18 and an overload protection mechanism 20. The lift link extends along a coupling axis.

Referring now to FIGS. 2-5, the overload protection mechanism 20 includes a plate 22 which is welded to an end of the lift link 14. A block 24 is welded to an end of the lift bar 16. The plate 22 has an opening 26 though which extends the lift bar 16. A pair of optional spacer members 28 and 30 are spaced apart from each other and are held between the plate 22 and the block 24. Alternatively, the spacers 28, 30 can be eliminated or formed integrally with the block 24. The overload protection mechanism 20 also includes a pair of clamping bolts 32 and 34. Each clamping member or bolt 32, 34 extends through corresponding bores in the plate 22, a corresponding one of the spacer members 28, 30 and the block 24 for clamping the plate 22, the spacer members 28, 30 and the block 24 together. The clamping bolts 32, 34 are in tension and each bolt has an axis which is parallel to the coupling axis. Alternatively, instead of the bolts 32, 34 extending through both the plate 22 and the block 24, they could be threaded into corresponding threaded bores (not shown) in either the plate 22 or the block 24. The plate 22, block 24, spacer members 28, 30 and clamping bolts 32, 34 form the overload protection mechanism 20. An adjusting link 18 has a first end 42 threadably coupled to the block 24 and has a second end 44 threadably coupled to the frame 10 of the baler needle.

The result is the overload protection mechanism 20 and a telescoping link 12 between the needle frame 10 that lifts the needles and the crank shaft or lift arm (not shown). When the needle frame 10 contacts something, the bolts 32, 34 stretch until they yield and break, and the needle frame 10 is no longer being pulled by the lift arm (not shown). As the lift arm (not shown) continues to rotate, the tube 14 and the plate 22 again comes into contact with the bar and block 24 and positively drives the needle frame 10 back to its home position. With this design, the bolts 32, 34 are always in tension and are not affected by fatigue, as are the bolts used in the prior art shear mechanisms. Since the bolts 32, 34 are always in tension, reverse loading is eliminated. The bolts 32, 34 do not fatigue over time so the maximum load value remains constant over time. With the constant known maximum load value, the mechanism doesn't have to be designed for a much higher shear value to protect against undesired nuisance shears. This enables other baler components to be designed to handle lower loads.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A lift link assembly for coupling a baler needle to a lift arm, the lift link assembly comprising:
   a lift link extending along a coupling axis, the lift link including a lost motion element; and
   an overload protection mechanism comprising:
   a block fixed to a first end of the lost motion element and coupled to a frame of the baler needle;
   a plate fixed to a second end of the lift link; and
   a clamping member for clamping the plate and the block together, the clamping member being in tension and having an axis which is substantially parallel to the coupling axis.

2. The lift link assembly of claim 1, wherein:
   the lost motion element extends through an opening in the plate.

3. The lift link assembly of claim 1, wherein:
   a spacer member is positioned between the plate and the block, the clamping member extending through the spacer member.

4. The lift link assembly of claim 1, wherein:
   the clamping member comprises a bolt.

5. The lift link assembly of claim 1, wherein:
   a further clamping member clamps the plate and the block together.

6. The lift link assembly of claim 5, wherein:
   each clamping member comprises a bolt.

7. The lift link assembly of claim 1, wherein:
   the block is coupled to the frame of the baler needle by an adjusting link having a first end threadably coupled to the frame of the baler needle and having a second end threadably coupled to the block.

8. The lift link assembly of claim 1, wherein:
   the lift link is hollow, and the lost motion element is slidably received by the lift link.

9. The lift link assembly of claim 3, wherein:
   a further spacer member is spaced apart from the other spacer member and is positioned between the plate and the block; and
   a further clamping member extends through the further spacer member.

10. The lift link assembly of claim 1, wherein:
    the clamping member extends through the plate and the block.

11. A lift link assembly for coupling a baler needle to a lift arm, the lift link assembly comprising:
    a hollow lift link;
    a lift bar slidably received by the lift link;
    a block fixed to an end of the lift bar and coupled to a frame of the baler needle;
    a plate fixed to an end of the lift link;
    a first clamping bolt for clamping the plate and the block together; and
    a second clamping bolt for clamping the plate and the block together, the first and second bolts being in tension.

12. The lift link assembly of claim 11, wherein:
    the first clamping bolt extends through the plate and the block; and
    the second clamping bolt extends through the plate and the block.

13. The lift link assembly of claim 11, further comprising:
    a first spacer member between the plate and the block; and
    a second spacer member between the plate and the block and spaced apart from the first spacer member.

14. The lift link assembly of claim 13, wherein:
    the first clamping bolt extends through the plate, the first spacer member and the block; and
    the second clamping bolt extends through the plate, the second spacer member and the block.

15. The lift link assembly of claim 13, wherein:
    an end of the lift bar is positioned between the first and second spacer members.

16. The lift link assembly of claim 11, wherein:
    the lift bar extends through an opening in the plate.

17. The lift link assembly of claim 11, wherein:
    each clamping bolt has an axis which is parallel to an axis of the lift link.

18. The lift link assembly of claim 11, wherein:
    the block is coupled to the frame of the baler needle by an adjusting link having a first end threadably coupled to the frame of the baler needle and having a second end threadably coupled to the block.

19. A lift link assembly for coupling a baler needle to a lift arm, the lift link assembly comprising:
    a hollow lift link extending along a coupling axis;
    a lift bar slidably received by the lift link;
    an adjusting link having a first end coupled to a frame of the baler needle and having a second end; and
    an overload protection mechanism comprising:
    a block fixed to an end of the lift bar and coupled to the second end of the adjusting link;
    a plate fixed to an end of the lift link;
    a first clamping bolt for clamping the plate and the block together; and
    a second clamping bolt for clamping the plate the block together, the first and second bolts being in tension, the clamping bolts being parallel to the coupling axis.

20. The lift link assembly of claim 19, wherein:
    the lift bar extends through an opening in the plate.

21. The lift link assembly of claim 19, further comprising:
    a first spacer member between the plate and the block; and
    a second spacer member between the plate and the block and spaced apart from the first spacer member.

22. The lift link assembly of claim 21, wherein:
    an end of the lift bar is positioned between the first and second spacer members.

23. The lift link assembly of claim 19, wherein:
    the first and second clamping bolt extend through the plate and the block.

* * * * *